UNITED STATES PATENT OFFICE.

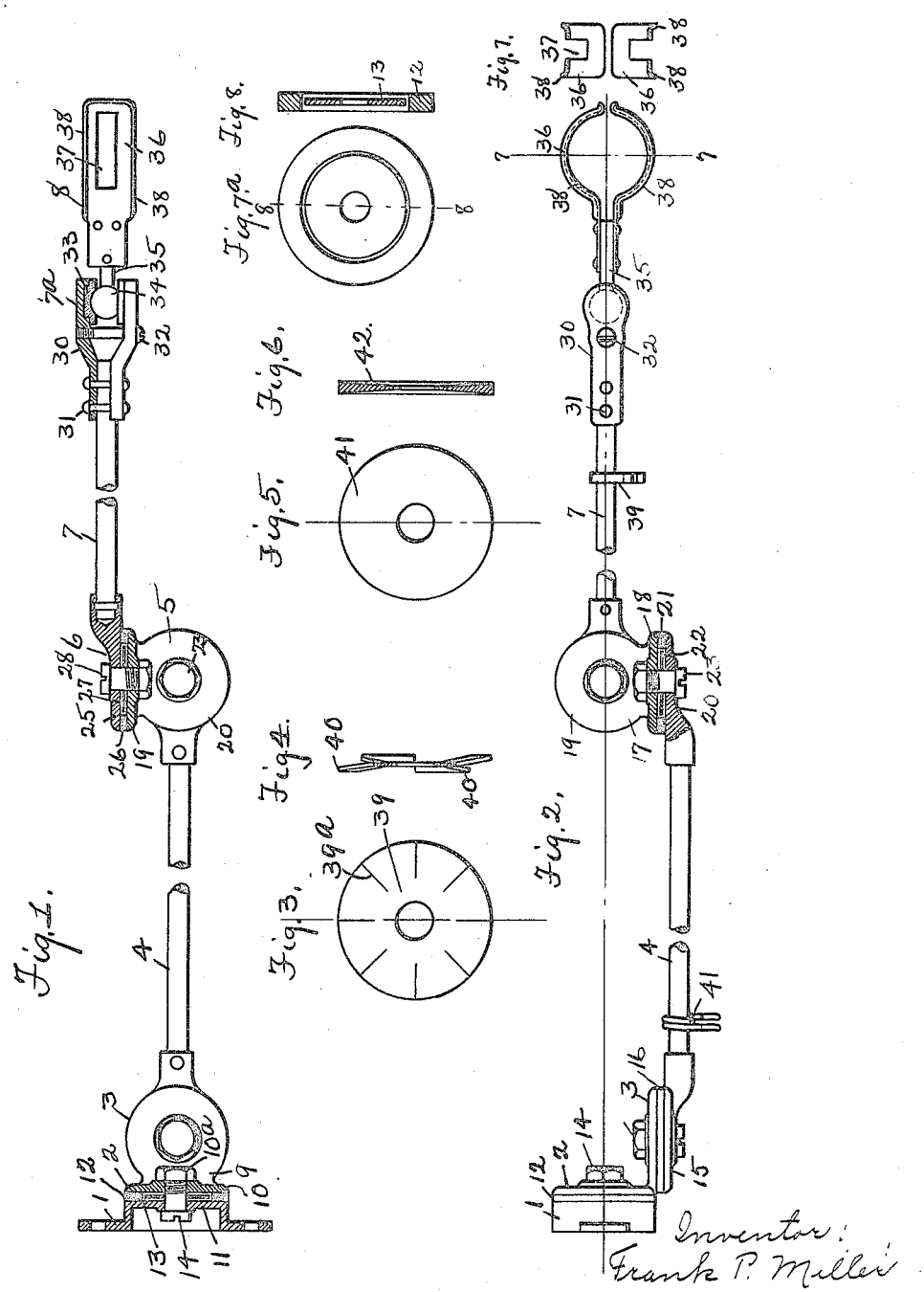

FRANK P. MILLER, OF MEADVILLE, PENNSYLVANIA.

BRACKET.

1,423,535.  Specification of Letters Patent.  Patented July 25, 1922.

Application filed December 16, 1919. Serial No. 345,430.

*To all whom it may concern:*

Be it known that I, FRANK P. MILLER, a citizen of the United States, residing at Meadville, in the county of Crawford and State of Pennsylvania, have invented new and useful Improvements in Brackets, of which the following is a specification.

This bracket is designed to hold electric lamps so that they may be readily adjusted to any position convenient for use.

The invention is illustrated in the accompanying drawings as follows:—

Fig. 1 shows a side elevation of the device, partly in section.

Fig. 2 is a plan view of the device, partly in section.

Figs. 3 and 4 show a type of washer for the joints.

Figs. 5 and 6 show an alternative construction of washer.

Fig. 7 is a section on the line 7—7 in Fig. 2.

Fig. 7ª shows a plan view of the washer 12.

Fig. 8 is a section on the line 8—8 in Fig. 7ª.

The joint is provided with the mounting member 1 on which is arranged a joint 2 from which extends a joint 3 with an axis at right angles to the axis of the joint 2. A projecting member 4 extends from the joint 3 and terminates in a joint 5. A joint 6 extends from the joint 5 with an axis at right angles to the axis of the joint 5. A projecting member 7 extends from the joint 6 and a lamp carrying clamp 8 is secured to the member 7 by means of a joint 7ª. The joints 2, 3, 5 and 6 are of similar construction. The joints 2 and 3 have an angle plate 9, one face 10 of the plate having a plane surface opposing a similar plane surface on the plate 11 of the mounting member 1. A washer 12 is interposed between the surfaces, the washer being cut away in its central portion 13 so that the engagement is only at the periphery. For convenience of manufacture I prefer to separate this central portion 13 from the outer portion 12 so that the two parts may be punched or cut from sheets of ordinary material although under some circumstances the two parts 12 and 13 may be made integral. A bolt 14 extends through the plates 10 and 11. It is screwed into the plate 10 and a jam nut 10ª is arranged on the end of the bolt. It will be noted that the plates 10 and 11 are of metal sufficiently resilient to permit of a slight springing of the metal in that part covering the cut-away or reduced thickness of the washer. In consequence there is a spring-pressed engagement between the surfaces along their outer edges. This gives a very smooth working joint and at the same time one that will remain in adjustment for an extended period. The joint 3 is made up of a plate 15 opposing the face of the angle plate 9 with an interposed washer 16 similar to the washer 12. An angle plate 17 is arranged between the joints 5 and 6 with the faces 18 and 19. The face 18 forms a part of the joint 5 and has a surface opposing a plane surface on the plate 20. A washer 21 is interposed between the surfaces, the washer being cut away or of less thickness in the central portion 22 than at the edges. A bolt 23 similar to the bolt 14 extends through the plates at the axis. The plates are slightly yielding giving a spring-pressed contact at the periphery of the plates. The joint 6 has a plate 25 opposing the face 19. These plates have plane surfaces with an interposed washer 26, the washer having a thinner central portion 27 and the plates being drawn together by the bolt 28, the joint operating in the same manner as the joints previously described. The joint 7ª is made up of the clamping plates 30 which are secured to the arm 7 by rivets 31. The plates 30 are sprung together by a screw 32. They are provided with the friction material 33 engaging a ball 34. A plate 35 extends from the ball 34 and the spring clamping arms 36 are secured to the plate 35 by rivets. The spring arms 36 have circumferential slots 37 and the rounded edges 38. The slots 37 engage a raised portion of a lamp socket so as to more readily hold the lamp and the round edges 38 permit of a ready insertion of such lamp. A clip 39 is provided for holding the cord.

The spring washer shown in Figs. 3 and 4 may be substituted in some instances for the washer shown in the joints in Figs. 1 and 2. In this case the washer 39 is made of metal of uniform thickness and has slits 39ª extending inwardly from its periphery and the portions 40 between the slits are struck up so as to effect a spring action at the edges.

In Figs. 5 and 6 a slightly different washer is shown. Here the washer 41 has a gradually tapering surface 42 increasing from the opening at the center to the outer periphery. In this instance the springing of the plates follows the surface 42 as far as the springing permits.

What I claim as new is:—

1. In a bracket, the combination of a mounting member and a yielding member; a joint between the members comprising joint plates with plane opposing surfaces, said plates being of resilient material; an interposed washer between the surfaces, said washer having a greater thickness at its outer periphery than at the center; and a connection between the plates at the axis of the joint, said connection springing the plate to effect a spring-pressed contact between the plates and washer at the periphery of the washer.

2. In a bracket, the combination of a mounting member and a yielding member; a joint between the members comprising joint plates with plane opposing surfaces, said plates being formed of resilient material; an interposed washer between the surfaces, said washer having a greater thickness at the periphery than at the center; and a bolt extending through the plates at the axis of the joint, the bolt springing the plates to make a spring-pressed contact between the plates and the washer at the periphery, said bolt centering the washer with relation to the joint.

3. A joint comprising resilient plates; a washer between the plates having a greater thickness at the periphery than at the center; and a bolt extending through the plates and washer springing the plates to give a spring-pressed contact at the periphery, said bolt centering the washer with relation to the joint.

In testimony whereof I have hereunto set my hand.

FRANK P. MILLER.